(No Model.)
H. CLAYTON.
HARVESTER TRUCK.
No. 291,878.   Patented Jan. 15, 1884.
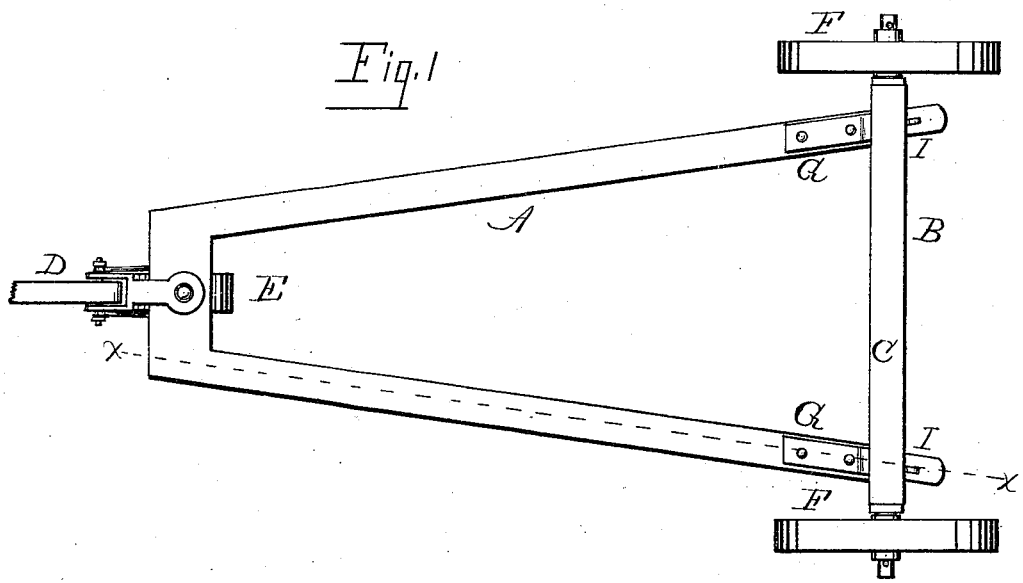
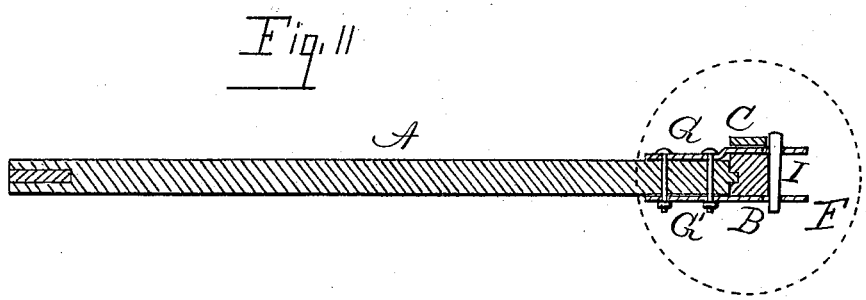
WITNESSES:
Leopold Leibold
John Trautmann
INVENTOR
Henry Clayton
BY B. Pickering
ATTORNEY

UNITED STATES PATENT OFFICE.

HENRY CLAYTON, OF DAYTON, OHIO.

HARVESTER-TRUCK.

SPECIFICATION forming part of Letters Patent No. 291,878, dated January 15, 1884.

Application filed November 12, 1883. (No model.)

*To all whom it may concern:*

Be it known that I, HENRY CLAYTON, a citizen of the United States, residing at Dayton, in the county of Montgomery and State of Ohio, have invented a certain new and useful Improvement in Harvester-Trucks; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to improvements in three-wheeled trucks for moving harvesters; and it consists of the manner of attaching the frame to the rear axle so that the same may be readily detached.

The detachable device consists of straps of iron bolted to the top and bottom of the side rails, and which embrace the axle, and are secured by a wedge-shaped key or pin.

The mechanism is illustrated in the accompanying drawings, in which Figure 1 is a top view of the three-wheeled truck. Fig. 2 is a longitudinal section on the line $x$.

Similar letters refer to similar parts throughout the several views.

A is the frame, consisting of two side rails connected at the front end by a cross-piece, to which the pivotal frame is attached that supports the spindle of the wheel E, and to which is likewise attached the tongue D. To the rear end of the side rails are bolted iron straps G G' on the upper and lower surfaces, the ends of said straps having slots for the taper-pin I. The wooden axle B is supported on the wheels F, and on the top of this axle is attached the board C, which serves to elevate the axle and to cover the upper straps of the rails, the same being cut away for the purpose. In addition to the notches in the board to prevent a lateral slipping of the side rails, the ends of the said rails enter shallow mortises in the axle. (See Fig. 2.) The iron straps of the side rails embrace the axle, and are there secured by the pin.

To load the harvester on the truck, first detach the axle, raise the harvester, and place the same beneath the frame near the driving-wheel, then from the opposite side of the axle the frame is slid beneath, and the straps are forced over the axle and then secured by the pin.

What I claim as my invention, and desire to secure by Letters Patent, is—

In a three-wheeled harvester-truck, the straps G G' of the side rails, and pin I for attachment to the axle B, substantially as set forth.

In testimony that I claim the foregoing as my own, I affix my signature in presence of two witnesses.

HENRY CLAYTON.

Witnesses:
 B. PICKERING,
 M. P. NOLAN.